United States Patent [19]

Kitoh et al.

[11] Patent Number: 4,874,650

[45] Date of Patent: Oct. 17, 1989

[54] THERMOSETTING FOAMING SEALER

[75] Inventors: Osamu Kitoh, Nagoya; Masahiko Ohashi, Inazawa, both of Japan

[73] Assignees: Toyota Jidosha Kabushiki Kaisha; Iida Industry Co., Ltd., both of Japan

[21] Appl. No.: 287,295

[22] Filed: Dec. 20, 1988

[30] Foreign Application Priority Data

Dec. 21, 1987 [JP] Japan .................................. 62-323480

[51] Int. Cl.4 ................................................. B32B 3/26
[52] U.S. Cl. ......................................... 428/68; 428/57; 428/71; 428/76; 428/189; 428/319.3
[58] Field of Search ........................ 428/57, 68, 71, 76, 428/189, 319.3

[56] References Cited

U.S. PATENT DOCUMENTS

| 4,269,890 | 5/1981 | Breitling et al. ........................ 428/71 |
| 4,356,676 | 11/1982 | Hauptman ............................. 428/71 |
| 4,399,174 | 8/1983 | Tanaka et al. ........................ 428/189 |
| 4,767,655 | 8/1988 | Tschudin-Mahrer ................... 428/71 |

FOREIGN PATENT DOCUMENTS

| 61-205109 | 9/1986 | Japan . |
| 61-205119 | 9/1986 | Japan . |
| 62-29477 | 2/1987 | Japan . |
| 62-62882 | 3/1987 | Japan . |
| 62-139739 | 6/1987 | Japan . |

Primary Examiner—William J. Van Balen
Attorney, Agent, or Firm—Finnegan, Henderson, Farabow, Garrett & Dunner

[57] ABSTRACT

A thermosetting foaming sealer of this invention is a thermosetting foaming sealer for filling up a vacant space. The thermosetting foaming sealer comprises a foaming substance having a shape substantially agreeing with a vacant space to be filled up, and a restraining substance for restraining the foaming substance in a compressed state, wherein the restraining substance is an elastomer having high viscosity at room temperature, substantially maintaining the compressed state of the compressed foaming substance, and coming to have low viscosity during paint film baking. The thermosetting foaming sealer can be provided firmly at a predetermined position and can fill up the vacant space at the predetermined position. Thus, desired silence, for instance, in an automobile has been attained by employing the thermosetting foaming sealer.

12 Claims, 5 Drawing Sheets

THERMOSETTING FOAMING SEALER

BACKGROUND OF THE INVENTION

1. Field of the Invention

This invention relates to a thermosetting foaming sealer for filling up a vacant space.

2. Description of the Prior Art

A slab urethane foam, which slowly recovers from deformation, has been proposed for a material for filling up an inner vacant space between pressed steel plates forming an automotive pillar portion, such as a front pillar and a quarter pillar through which engine noise and wind whistle are transmitted from an engine room and environment to inside of an antomobile. The slab urethane foam is provided in the automotive pillar portion in order to improve silence in the automobile during driving.

For instance, a slab urethane foam disclosed in Japanese Unexamined Patent Publication (KOKAI) No. 139739/1987 fills up an inner vacant space between pressed steel plates as shown in FIGS. 10 and 11 in the following manner. First, a slab urethane foam 200 is compressed manually. Then, the compressed slab urethane foam 200 is inserted in a vacant space between pressed steel plates 100, 100 through an opening 110 before it restores to its original size. The pressed steel plates 100, 100 form the automotive pillar portion. After inserting, the slab urethane foam 200 fills up the vacant space between the pressed steel plates 100, 100 as shown in FIG. 11, while utilizing its property restoring to its original size.

The slab urethane foam, which has been employed for the above-mentioned purpose, is inserted in the inner vacant space between the pressed steel plates through the opening in an assembling process. However, the slab urethane foam has restored to its original size while it is placed at a predetermined position, and has not completely filled up the inner vacant space at the predetermined position. Even when the slab urethane foam has been inserted to completely fill up the vacant space between the pressed steel plates in the assembling process, the slab urethane foam is displaced from the predetermined position and the silence in the automobile might deteriorate because the slab urethane foam has less bonding property to steel plates having oily surfaces. In addition, it is inevitable that the slab urethane foam providing position varies from the predetermined position, because the slab urethane foam is manually inserted into the vacant space.

SUMMARY OF THE INVENTION

It is therefore an object of this invention to overcome the drawbacks of the prior art slab urethane foam.

A thermosetting foaming sealer of this invention is a thermosetting foaming sealer for filling up a vacant space. The thermosetting foaming sealer comprises a foaming substance having a shape substantially agreeing with a vacant space to be filled up, and a restraining substance for restraining the foaming substance in a compressed state, wherein the restraining substance is an elastomer having high viscosity at room temperature, substantially maintaining the compressed state of the compressed foaming substance, and coming to have low viscosity during paint film baking.

The foaming substance has a shape substantially agreeing with a vacant space to be filled up. This foaming substance is compressed to a predetermined shape with press dies, and restrained in the compressed state by wrapping or binding with the restraining substance later described so as not to restore to its original size. For a material for the foaming substance, a polyurethane foam having continuous cells may be preferred. But the material is not limited thereto, so far as it is undestructible by the compression and restorable to its original shape by relieving the restraining force.

The restraining substance comprises an elastomer which restrains the foaming substance in itself at room temperature in order to prevent the foaming substance from restoring to its original size, and which foams at temperature of the paint film baking to free the foaming substance from the restraining, and which deposits and hardens on inner walls defining the vacant space. This elastomer may be a mixture comprising unvulcanized rubber, monomer, mineral oil, filler powder and vulcanizer. Here, the unvulcanized rubber, monomer and mineral oil improve the adhesive property of the elastomer, and the filler powder improves the viscosity at room temperature. Tar, atactic polypropylene, low polymer may be mixed in the elastomer to allow such viscosity. For the filler powder, the following may be employed, i.e. inorganic powder such as talc, clay and mica, and organic powder such as wood flour.

In addition, the elastomer may be a composite substance comprising an adhesive member and a restraining member. For the adhesive member, the above mixture may be employed as it is, or the mixture with reduced amount of the filler powder or free from the filler powder may be employed. The restraining member may be integrally buried in the adhesive member, or laminated integrally with the adhesive member. The restraining member may be plastic having glass transition temperature higher than room temperature and lower than the temperature of the paint film baking. This plastic is formed into a fiber shape, a string shape or a sheet shape. The plastic, namely the restraining member, and the adhesive member may preferably be integrated like fibers in FRP, reinforced cloths in a rubber sheet or reinforced layers in a multi-layered sheet. For the plastic, the following is appropriate, i.e. polyethylene, polyvinyl chloride, thermoplastic polyurethane, ABS and polystyrene.

The thermosetting foaming sealer of this invention thus arranged is provided at a predetermined position on one of parts defining an inner vacant space to be filled up before assembling the parts. The thermosetting foaming sealer is compressed with the restraining substance having high viscosity at room temperature, and is held at the predetermined position on the part. After providing the thermosetting foaming sealer, the parts in which the thermosetting foaming sealer has been provided are assembled by welding or the like. Then, coating is done to form a paint film on the parts in a coating process subsequent to the assembling process. Further, the paint film is dried or baked in a paint drying process subsequent to the coating process. The restraining substance of the thermosetting foaming sealer lowers its viscosity by heat generated during the baking because the restraining substance comprises the elastomer which comes to have low viscosity during the paint film baking. Accordingly, the restraining substance frees the foaming substance from the restraining at the temperature of the paint film baking. The foaming substance restores to its original size and fills up the vacant space, as it is freed from the restraining by the restraining substance. The elastomer, namely the restraining substance, deposits and hardens on inner walls defining the inner vacant space. As a result, the thermosetting foaming sealer of this invention fills up the inner vacant space and is held firmly in the inner vacant space.

The thermosetting foaming sealer of this invention can be provided appropriately at a predetermined position on the parts or between pressed steel plates, because it is provided before the assembling process. Consequently, the thermosetting foaming sealer has overcome the following drawbacks associating with the conventional slab urethane foam: Desired silence has not attained because the slab urethane foam cannot be provided at a predetermined position and does not fill up the vacant space at the predetermined position.

The thermosetting foaming sealer can prevent the providing position from being displaced and the resulting deterioration in the silence, which associates with the slab urethane foam, because the restraining substance of the thermosetting foaming sealer comprises a material having high bonding property to steel plates having oily surfaces.

In addition, the thermosetting foaming sealer can reduce transportation cost, because the thermosetting foaming sealer has the compressed foaming substance within itself and is so small that it occupies less space during storage.

Heating is required to fill up the vacant space between the pressed steel plates with the thermosetting foaming sealer, however it is done by using the heat generated by the coating drying process subsequent to the electrodeposited coating process and is done simultaneously with the drying of the electrodeposited coating. Therefore, the filling-up operation is economical because no special heating process for the operation is needed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Having generally described this invention, a further understanding can be obtained by reference to certain specific preferred embodiments which are provided herein for purpose of illustration only and are not intended to be limiting unless otherwise specified.

First Preferred Embodiment

The first preferred embodiment of the thermosetting foaming sealer according to this invention will be hereinafter described with reference to FIGS. 1 to 6.

Figure 1:
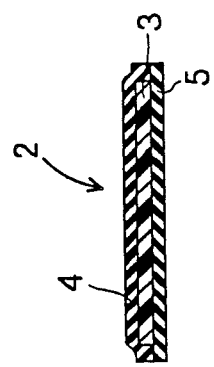
FIG. 1 is a perspective view illustrating a foaming substance of a thermosetting foaming sealer of a first preferred embodiment according to this invention.

A polyurethane foam material having an apparent density of 0.05 g/cm$^3$ was cut to a foaming substance 3 having a trapezoidal cross section as shown in FIG. 1. The foaming substance 3 has a rectangular bottom surface of 40 mm × 100 mm, a rectangular top surface of 20 mm × 80 mm and a height of 60 mm, and is compressed to a thin plate shape.

Figure 2:
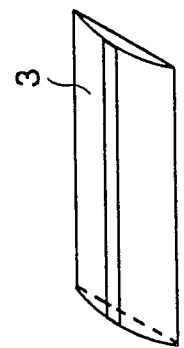
FIG. 2 is a perspective view illustrating the foaming substance in a compressed state.

The foaming substance 3 having the trapezoidal cross section was compressed at the top surface to a rectangular thin plate of 40 mm × 100 mm as shown in FIG. 2.

Figure 3:
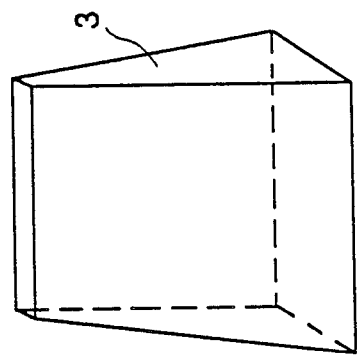
FIG. 3 is a schematic cross sectional view illustrating the thermosetting foaming sealer of the first preferred embodiment according to this invention, in which the compressed foaming substance is restrained with restraining substances.

Then, a thermosetting foaming rubber material was prepared. The thermosetting foaming rubber material comprised 35% by weight of styrene-butadiene rubber, 25% by weight of process oil, 6% by weight of vulcanizer and foaming agent and 34% by weight of talc. The thermosetting foaming rubber material showed a foaming ratio of 80%. A thin plate 4 of 60 mm × 120 mm × 4 and a thin plate 5 of 60 mm × 120 mm × 2 mm were molded out of the thermosetting foaming rubber material. Two restraining substances 4 and 5 were thus made. As shown in FIG. 3, the restraining substance 5 was placed at the bottom, and the compressed foaming substance 3 was placed on the restraining substance 5, and finally the restraining substance 4 was placed on the compressed foaming substance 3. After placing the restraining substance 4, four sides of the restraining substances 4 and 5 were pressed to wrap the compressed foaming substance 3 with the restraining substances 4 and 5. Thus, the thermosetting foaming sealer 2 of the first preferred embodiment according to this invention was obtained, and the thermosetting foaming sealer 2 was a thin plate shape of 60 mm × 120 mm × approximately 9 mm.

The thermosetting foaming sealer 2 thus arranged was bonded at a predetermined place on one of two pressed steel plates 1, 1 having a U-shaped cross section. The size of the U-shaped cross section of the pressed steel plate 1 was 110 mm in length at the opening and 32.5 mm in depth. When the two pressed steel plates 1, 1 were assembled, a vacant space of 65 mm×110 mm in a rectangular cross section was formed in the assembly.

Figure 4:
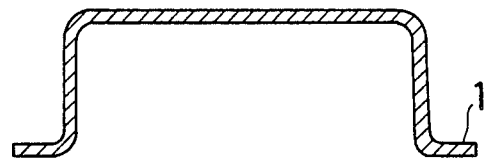
FIG. 4 is a schematic cros sectional view illustrating an application of the thermosetting foaming sealer of the first preferred embodiment according to this invention to a vacant space in a square pipe made of pressed steel plates.
Figure 4:
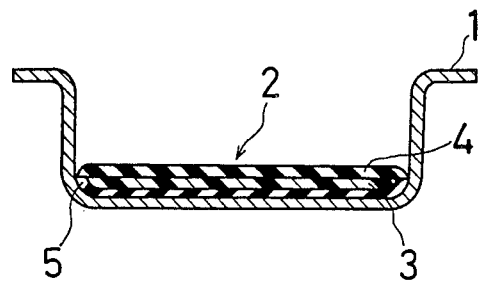

After bonding the thermosetting foaming sealer 2, another pressed steel plate 1 free from the bonding of the thermosetting foaming sealer 2 was placed on the pressed steel plate 1 with the thermosetting foaming sealer 2 bonded as shown in FIG. 4. The two pressed steel plates 1, 1 were then welded to make a square pipe.

Figure 5:
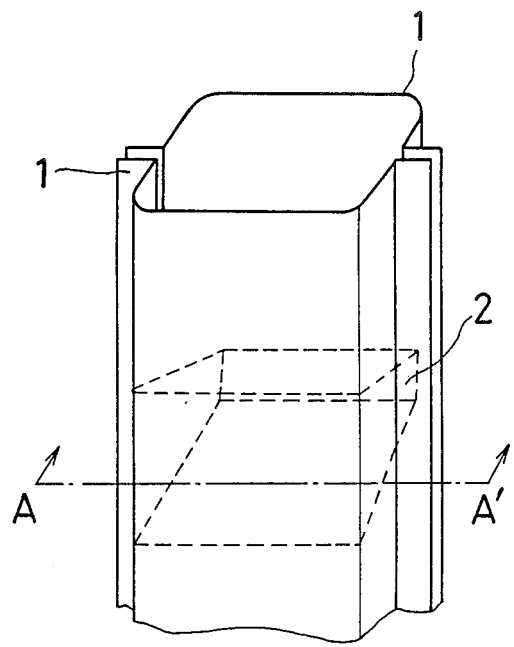
FIG. 5 is a perspective view illustrating the vacant space filled up with the thermosetting foaming sealer of the first preferred embodiment according to this invention.
Figure 6:
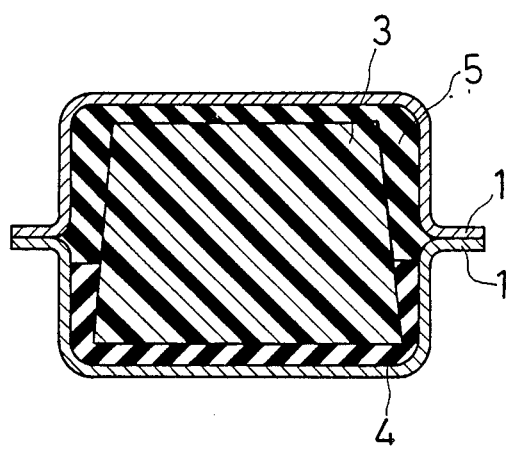
FIG. 6 is a cross sectional view taken in the direction of the arrows A-A' of FIG. 5.

The square pipe made of two pressed steel plates 1, 1 with the thermosetting foaming sealer 2 bonded inside was placed in an electric oven. Then, temperature in the electric oven was raised to 180° C., and the square pipe was heated for 30 minutes. The viscosity of the restraining substances 4 and 5 was lowered by the heating, and the foaming substance 3 restored to its original size. Further, the restraining substances 4 and 5 foamed and vulcanized to foaming rubber, and joined to inner walls of the pressed steel plates by vulcanization. As a result, the vacant space of 65 mm×110 mm in the rectangular cross section was filled up with the thermosetting foaming sealer 2 as shown in FIGS. 5 and 6.

Second Preferred Embodiment

The second preferred embodiment of the thermosetting foaming sealer according to this invention will be hereinafter described.

The polyurethane foam material employed in the first preferred embodiment was cut to a foaming substance 3 having a cubic shape of 40 mm×40 mm×40 mm. The foaming substance 3 is compressed to a thin plate shape.

The foaming substance 3 having the cubic shape was compressed at the top surface to a square thin plate of 40 mm×40 mm.

Then, the thermosetting foaming rubber material prepared in the first preferred embodiment was molded into a thin plate 4 of 60 mm×60 mm×4 mm and a thin plate 5 of 60 mm×60 mm×2 mm. Two restraining substances 4 and 5 were thus made. Again, as shown in FIG. 3, the restraining substance 5 was placed at the bottom, and the compressed foaming substance 3 was placed on the restraining substance 5, and finally the restraining substance 4 was placed on the compressed foaming substance 3. After placing the restraining substance 4, four sides of the restraining substances 4 and 5 were pressed to wrap the compressed foaming substance 3 with the restraining substances 4 and 5. Thus, the thermosetting foaming sealer 6 of the second preferred embodiment according to this invention wa obtained, and the thermosetting foaming sealer 6 was a thin plate shape of 60 mm×60 mm×approximately 9 mm.

The thermosetting foaming sealer 6 thus arranged was bonded at a predetermined place on one of two pressed steel plates 1, 1 having a U-shaped cross section. In this preferred embodiment, the bottom surface of the U-shaped cross section of the two pressed steel plates 1, 1 was coated with a commercially available rust preventive oil before bonding the thermosetting foaming sealer 6. The size of the U-shaped cross section of the pressed steel plate 1 was 50 mm in length at the opening and 22.5 mm in depth. When the two pressed steel plates 1, 1 were assembled, a vacant space of 45 mm×50 mm in a rectangular cross section was formed in the assembly.

After bonding the thermosetting foaming sealer 6, another pressed steel plate 1 free from the bonding of the thermosetting foaming sealer 6 was placed on the pressed steel plate 1 with the thermosetting foaming sealer 6 bonded as shown in FIG. 4. The two pressed steel plates 1, 1 were then welded to make a square pipe.

Figure 7:
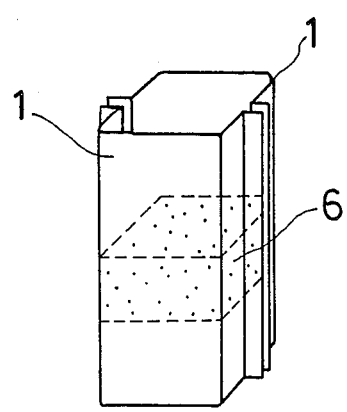
FIG. 7 is a perspective view illustrating the vacant space filled up with a thermosetting foaming sealer of a second or third preferred embodiment according to this invention.

The square pipe made of the two pressed steel plates 1, 1 with the thermosetting foaming sealer 6 bonded inside was placed in an electric oven in an upright manner. Then, temperature in the electric oven was raised to 180° C., and the square pipe was heated for 30 minutes. The viscosity of the restraining substances 4 and 5 was lowered by the heating, and the foaming substance 3 restored to its original size. Further, the restraining substances 4 and 5 foamed and vulcanized to foaming rubber, and joined to inner walls of the pressed steel plates 1, 1 by vulcanization. As a result, the vacant space of 45 mm×50 mm in the rectangular cross section was filled up with the thermosetting foaming sealer 6 as shown in FIG. 7.

Third Preferred Embodiment

Figure 8:
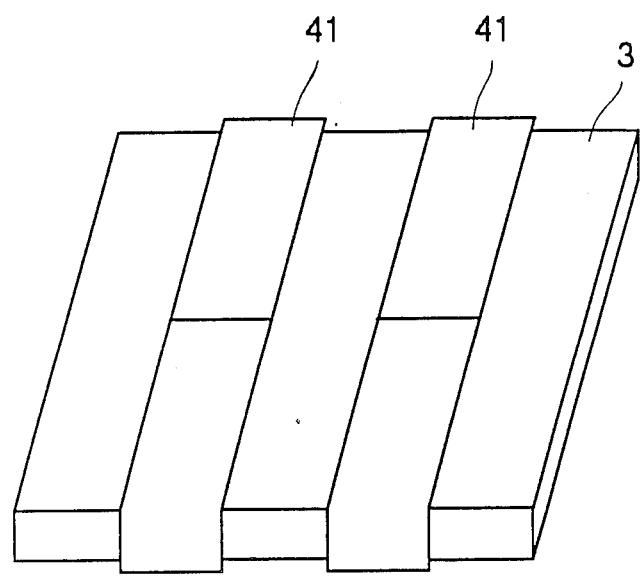
FIG. 8 is a perspective view illustrating a compressed foaming substance of the thermosetting foaming sealer of the third preferred embodiment according to this invention which is restrained with restraining members of the thermosetting foaming sealer of the third preferred embodiment according to this invention.
Figure 9:
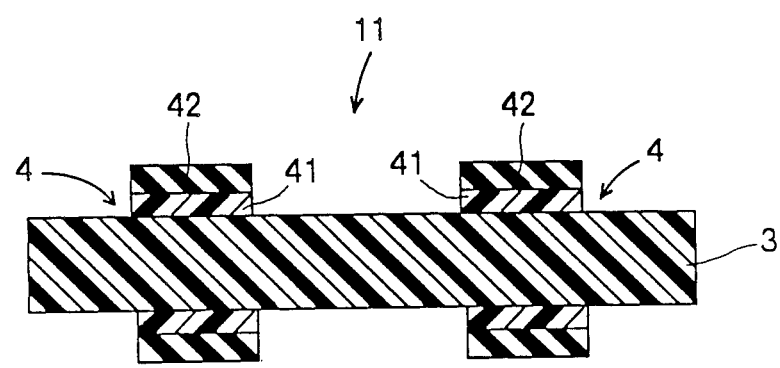
FIG. 9 is a schematic cros sectional view of the thermosetting foaming sealer of the third preferred embodiment according to this invention.
Figure 10:
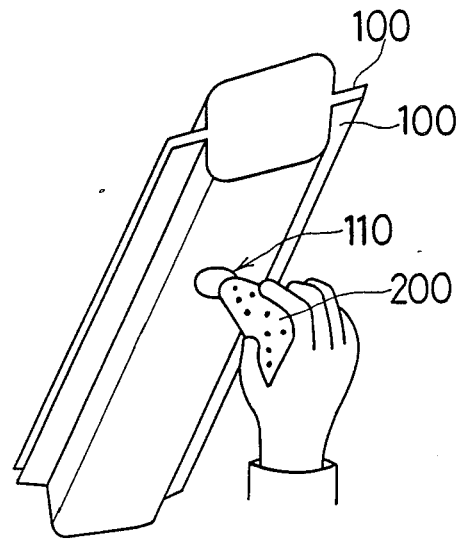
FIG. 10 is a perspective view illustrating how a vacant space in a square pipe made of pressed steel plates is filled up with a conventional slab urethane foam.
Figure 11:
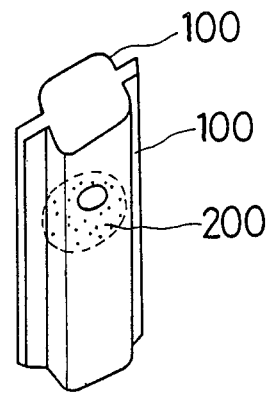
FIG. 11 is a perspective view illustrating the vacant space filled up with the conventional slab urethane foam.

The third preferred embodiment of the thermosetting foaming sealer according to this invention will be hereinafter described with reference to FIGS. 8 to 9.

The polyurethane foam material employed in the first preferred embodiment was cut to a foaming substance 3 having a cubic shape of 60 mm×60 mm×60 mm. The foaming substance 3 is compressed to a thin plate shape.

The foaming substance 3 having the cubic shape was compressed at the top surface to a square thin plate of 60 mm×60 mm.

Then, a polyethylene sheet was cut to a tape shape of 2 mm in thickness and 10 mm in width. The polyetylene tape was made into two restraining members 41, 41. After winding the restraining members 41, 41 around the compressed foaming substance 3, the ends of the restraining members 41, 41 are welded together by heating to bind the compressed foaming substance 3 as shown in FIG. 8, thereby preventing the compressed foaming substance 3 from restoring to its original size. Further, the thermosetting foaming rubber material prepared in the first preferred embodiment was molded into two tape shaped moldings of 2 mm in thickness and 10 mm in width, and made into tape shaped adhesive members 42, 42. After winding the tape shaped adhesive members 42, 42 around the restraining members 41, 41, the ends of the tape shaped adhesive members 42, 42 were pressed to make restraining substances 4, 4 comprising the restraining members 41, 41 and the adhesive members 42, 42. Thus, the thermosetting foaming sealer 11 of the third preferred embodiment according to this invention was obtained.

In a manner similar to the second preferred embodiment, the thermosetting foaming sealer 11 thus arranged was bonded at a predetermined place on one of two pressed steel plates 1, 1 having the U-shaped cross section. The two pressed steel plates were the same ones as used in the second preferred embodiment. Also, in this preferred embodiment, the bottom surface of the U-shaped cross section of the two pressed steel plates 1, 1 was coated with the commercially available rust preventive oil before bonding the thermosetting foaming sealer 11.

Similarly to the second preferred embodiment, the two pressed steel plates 1, 1 were welded to make a square pipe as shown in FIG. 7 after assembling them.

The square pipe made of the two pressed steel plates 1, 1 with the thermosetting foaming sealer 11 bonded inside was placed in an electric oven in the manner described in the Second Preferred Embodiment section. Then, temperature in the electric oven was raised to 180° C., and the square pipe was heated for 30 minutes. The viscosity of the restraining substances 4, 4 was lowered by the heating, and the foaming substance 3 restored to its original size. Further, the adhesive members 42, 42 foamed and vulcanized to foaming rubbers, and joined to inner walls of the pressed steel plates 1, 1 by vulcanization. As a result, the vacant space in the square pipe was filled up with the thermosetting foaming sealer 11 as shown in FIG. 7. In this third preferred embodiment, the material cost for making the restraining substance could be reduced by employing the arrangement described so far for the thermosetting foaming sealer.

Having now fully described the invention, it will be apparent to one of ordinary skill in the art that many changes and modifications can be made thereto without departing from the spirit or scope of the invention as set forth herein.

What is claimed is:

1. A thermosetting foaming sealer for filling up a vacant space comprising:
    a foaming substance having a shape substantially agreeing with a vacant space to be filled up; and
    a restraining substance for restraining said foaming substance in a compressed state; wherein
    said restraining substance is an elastomer having high viscosity at room temperature, substantially maintaining said compressed state of said compressed foaming substance, and coming to have low viscosity during paint film baking.

2. A thermosetting foaming sealer for filling up a vacant space according to claim 1, wherein
    said foaming substance comprises a polyurethane foam having continuous cells.

3. A thermosetting foaming sealer for filling up a vacant space according to claim 1, wherein
    said elastomer comprises unvulcanized rubber, monomer, mineral oil, filler powder and vulcanizer.

4. A thermosetting foaming sealer for filling up a vacant space according to claim 3, wherein
    said elastomer further comprises tar, atactic polypropylene and low polymer.

5. A thermosetting foaming sealer for filling up a vacant space according to claim 3, wherein
    said filler powder comprises at least one selected from the group consisting of talc, clay, mica and wood flour.

6. A thermosetting foaming sealer for filling up a vacant space according to claim 1, wherein
    said elastomer is a composite substance comprising an adhesive member and a restraining member.

7. A thermosetting foaming sealer for filling up a vacant space according to claim 6, wherein
    said restraining member is plastic having glass transition temperature higher than room temperature and lower than temperature of paint film baking.

8. A thermosetting foaming sealer for filling up a vacant space according to claim 7, wherein
    said plastic is formed into a fiber shape, a string shape or a sheet shape.

9. A thermosetting foaming sealer for filling up a vacant space according to claim 7, wherein
    said plastic is selected from the group consisting of polyethylene, polyvinyl chloride, thermoplastic polyurethane, ABS and polystyrene.

10. A thermosetting foaming sealer for filling up a vacant space according to claim 1, wherein
    said foaming substance has a trapezoid shape cross section.

11. A thermosetting foaming sealer for filling up a vacant space according to claim 1, wherein
    said foaming substance has a cubic shape.

12. A thermosetting foaming sealer for filling up a vacant space according to claim 1, wherein
    said restraining substance has bonding property to oily surfaces.

* * * * *